No. 621,280. Patented Mar. 14, 1899.
W. P. PITT.
ROTARY PUMP.
(Application filed Dec. 22, 1897.)
(No Model.) 2 Sheets—Sheet 1.

Witnesses:
Sam. Kernahan
G. H. Thorpe

Inventor
Wm. P. Pitt
By F. G. Fischer
Atty.

No. 621,280. Patented Mar. 14, 1899.
W. P. PITT.
ROTARY PUMP.
(Application filed Dec. 22, 1897.)
(No Model.) 2 Sheets—Sheet 2.

Witnesses:
Sam. Kernahan
G. J. Thorpe

Inventor:
Wm P. Pitt
By F. G. Fischer
Atty.

THE NORRIS PETERS CO., PHOTO-LITHO., WASHINGTON, D. C.

ated March 14, 1899.

UNITED STATES PATENT OFFICE.

WILLIAM P. PITT, OF INDEPENDENCE, MISSOURI.

ROTARY PUMP.

SPECIFICATION forming part of Letters Patent No. 621,280, dated March 14, 1899.

Application filed December 22, 1897. Serial No. 663,091. (No model.)

*To all whom it may concern:*

Be it known that I, WILLIAM P. PITT, a citizen of the United States, residing at Independence, in the county of Jackson and State of Missouri, have invented certain new and useful Improvements in Rotary Pumps, of which the following is a specification, reference being had therein to the accompanying drawings.

My invention relates to pumps, and more especially to that type which embody intermeshing gears or pistons arranged in pairs and suitably incased, the casing having an induction-port in its bottom and an eduction-port in its top, and has for its object to provide a simple, durable, inexpensive, and efficient pump that can be operated with a minimum expenditure of power and which may be used conveniently in numerous connections to very great advantage.

To this end the invention consists in certain novel and peculiar features of construction and organization of parts, as will be hereinafter described and claimed.

In order that the invention may be fully understood, I will proceed to describe it with reference to the accompanying drawings, in which—

Figure 1:
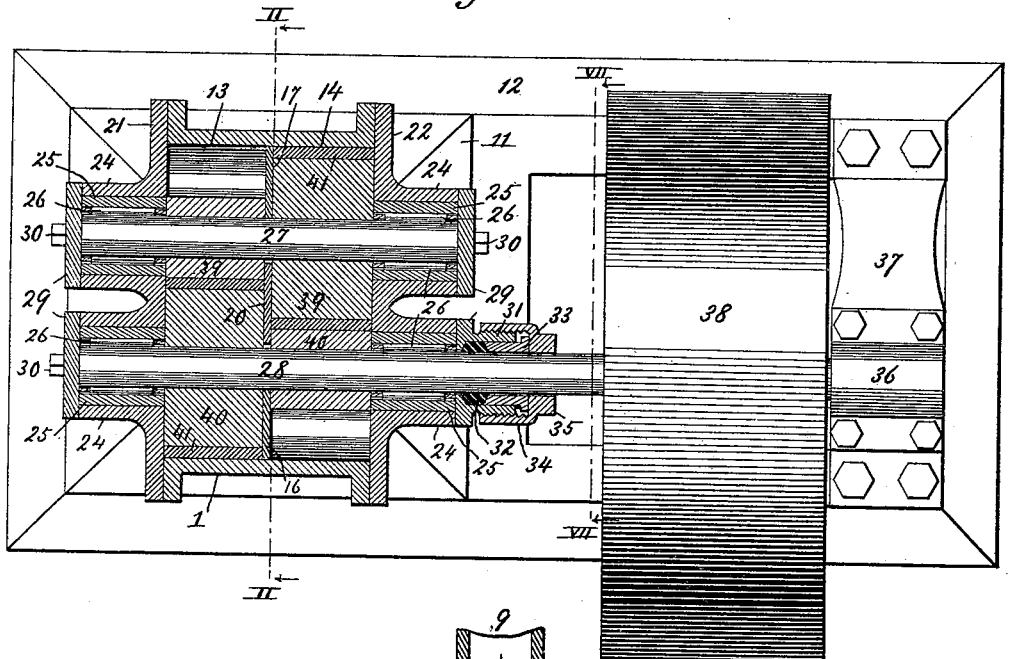
Figure 2:
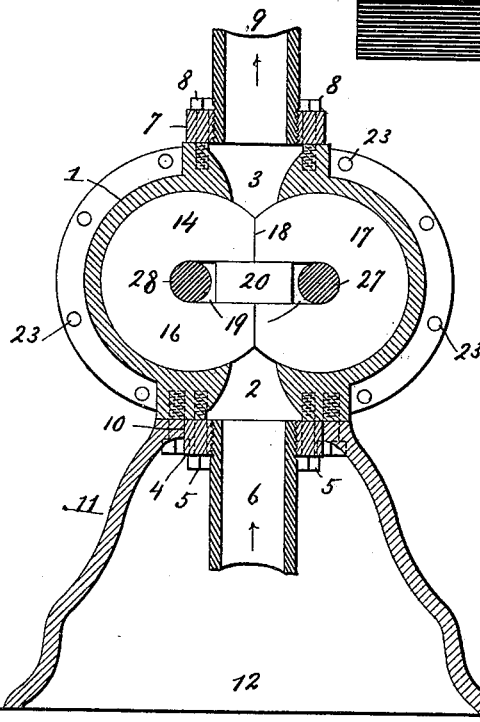
Figure 3:
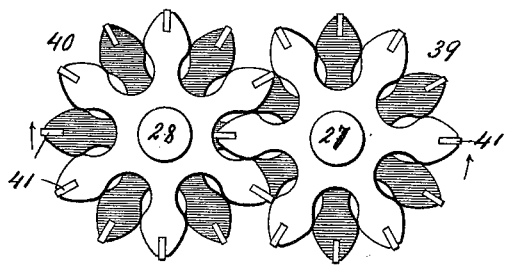
Figure 4:
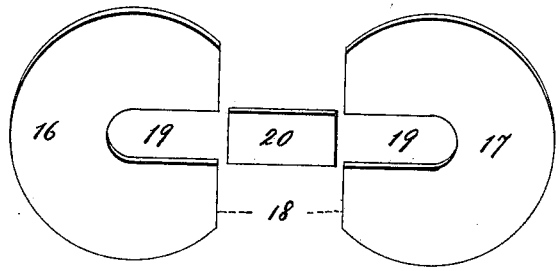
Figure 5:
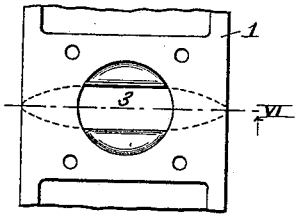
Figure 6:
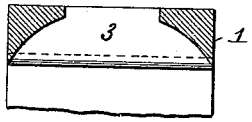
Figure 7:
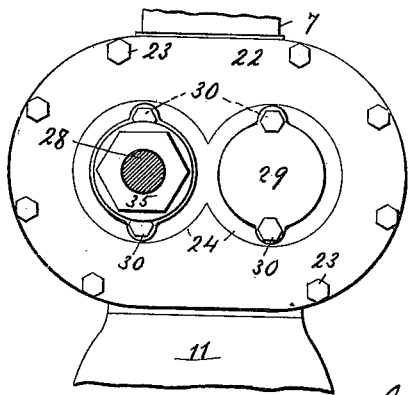

Figure 1 is a horizontal section of a pump embodying my improvements. Fig. 2 is a section taken on the line II II of Fig. 1. Fig. 3 is an end view of a pair of the intermeshing pistons or gears. Fig. 4 is an enlarged detail perspective of the partition of the casing, the parts of said partition being detached from each other. Fig. 5 is a plan view to illustrate the formation of the ports. Fig. 6 is a section taken on the line VI VI of Fig. 5. Fig. 7 is a section taken on the line VII VII of Fig. 1.

In the said drawings, 1 designates the cylinder or casing of the pump, which is formed with two nearly-circular chambers in the same horizontal plane that communicate with each other and have centrally at their point of junction the induction-port 2 in the bottom of the cylinder and an eduction-port 3 vertically above in the top of the cylinder. The formation of these ports is identical and is clearly illustrated by Figs. 5 and 6, where it will be observed that the interior end of the port is elongated in the direction of the length of the cylinder, while the exterior end of said port is circular to correspond with the supply and discharge pipes hereinafter referred to.

4 designates a plate secured by cap-screws 5 to the bottom of the cylinder and provided with a threaded opening communicating with port 2 and adapted to receive the threaded upper end of a suction-pipe 6, said pipe being connected directly or indirectly to the water-supply. (Not shown.)

7 designates a plate similar to plate 4, which is secured by cap-screws 8 to the top of the cylinder and is provided with an opening to receive the discharge-pipe 9 to carry off the water forced through the eduction-port.

The plate 4 fits snugly in an opening 10 in the flat top of a raised portion 11, formed integral with the forward portion of base 12.

The cylinder is divided into two similar compartments 13 and 14, with the induction and eduction ports common to both, by means of a partition comprising the two similar segmental plates 16 and 17, having their meeting edges straight or flat, as shown at 18, said meeting edges extending vertically and in axial alinement with the induction and eduction ports. Said plates are provided in their straight edges with registering or coincidental notches 19, whereby they may be easily slipped upon certain shafts, to be hereinafter described, said notches being mainly closed by a plate 20 to prevent a free flow of water from one compartment to the other at this point.

The ends of the cylinder are closed by head-plates 21 22, secured by cap-screws 23 to the end flanges of the cylinder, and said head-plates are provided in axial alinement with the circular chambers with outwardly-projecting tubular bosses 24, preferably of considerable length, in order that the wear upon the bearings may be reduced to the minimum. These bosses are lined with cylindrical bushings or thimbles 25 of hardened metal, and journaled therein and upon the shafts 27 and 28 are the roller-bearings 26, being of a type now in common use. The shaft 27 extends through the inner end of the notch 19 of plate 17 and projects at either end to the outer terminals of the bosses, endwise movement being prevented by the caps 29, secured by cap-screws 30 to the outer ends of the bosses. The main shaft 28 extends through the inner end of notch 19 of plate 16 and bears at one end against the cap 29, securely bolted to the corresponding boss 24. The main shaft being of greater length than shaft 27 consequently projects through and beyond the cap 29 at the opposite end of the cylinder, thereby forming a joint. Said cap is provided with an outward tubular extension 31 to receive the packing material 32 and the bushing 33, pressed against the packing material by the internally-threaded cap 34, said cap being provided with a hexagonal head 35 for convenient engagement with a wrench. The opposite end of shaft 28 is journaled in a bearing-box 36 of standard 37, bolted down upon the base 12. Rigidly mounted upon said shaft is a belt-wheel 38.

39 and 40 designate a double pair of rotary pistons mounted, respectively, upon the shafts 27 28 and fitting snugly in the compartments at opposite sides of the partition hereinbefore described, one pair being staggered with respect to the other. These "pistons" or "suction gear-wheels," as they might appropriately be termed, intermesh, the tooth of one in the pocket of the other, to the end that their rapid revolution shall suck the water up through the pipe 6 and forcibly discharge it through pipe 9, and in order to obtain the maximum amount of work out of the pump the periphery or outer edge of each tooth is provided with a wear-strip 41 of soft metal for frictional contact with the walls of the chambers, which strips may be replaced when worn.

By employing the central partition it is obvious that the water entering the cylinder is divided into two distinct branches or streams, which again unite at the common outlet—i.e., the eduction port—and it is also clear that the operation is facilitated and the capacity of the pump increased, because the water does not have an opportunity to run back and forth from one set of pistons to the other, as would happen if the partition were dispensed with.

Having thus described my invention, what I claim as new, and desire to secure by Letters Patent, is—

The herein-described pump, comprising a cylinder containing two segmental communicating chambers and induction and eduction ports communicating with said chambers; a partition dividing said chambers into two compartments, consisting of a pair of notched plates having meeting flat sides and a connecting-plate in said notches; shafts extending through said notched plates, one of them a driven shaft; a pair of rotary pistons upon one of them, at opposite sides of the partition and a pair of pistons upon the driven shaft, meshing with and operating the first-named pistons, substantially as described.

In testimony whereof I affix my signature in presence of two witnesses.

WILLIAM P. PITT.

Witnesses:
MARY D. LAWRENCE,
SAM KERNAHAN.